United States Patent [19]

Ikebe et al.

[11] Patent Number: 4,587,469
[45] Date of Patent: May 6, 1986

[54] ELECTRIC SERVO SYSTEM

[75] Inventors: Yo Ikebe, Tokyo; Hiromu Hirai, Ibaraki, both of Japan

[73] Assignee: Hitachi, Ltd., Tokyo, Japan

[21] Appl. No.: 416,626

[22] Filed: Sep. 10, 1982

[30] Foreign Application Priority Data

Sep. 14, 1981 [JP] Japan ................... 56-143865

[51] Int. Cl.[4] ............................... H02P 7/00
[52] U.S. Cl. .................... 318/432; 318/632; 318/561
[58] Field of Search ............ 318/561, 632, 611, 623, 318/615, 432, 433, 430, 648

[56] References Cited

U.S. PATENT DOCUMENTS

| | | | |
|---|---|---|---|
| 3,555,391 | 1/1971 | Younkin | 318/611 X |
| 3,746,955 | 7/1973 | Kobayashi | 318/561 |
| 3,864,554 | 2/1975 | Chevalier | 318/611 X |
| 3,916,279 | 10/1975 | Kawano | 318/632 X |
| 3,917,930 | 11/1975 | Davey | 318/632 X |
| 4,071,886 | 1/1978 | Eicher | 318/632 X |
| 4,143,311 | 3/1979 | Lee | 318/611 |
| 4,156,162 | 3/1979 | Warfield | 318/433 X |
| 4,345,194 | 8/1982 | Green | 318/632 X |
| 4,349,868 | 9/1982 | Brown | 318/561 X |

Primary Examiner—William M. Shoop, Jr.
Assistant Examiner—Patrick C. Keane
Attorney, Agent, or Firm—Antonelli, Terry & Wands

[57] ABSTRACT

An electric servo system has an electrical drive and a controllable object driven by the electrical drive whereby an error between an actual amount of actuation of the controllable object and a target value toward which the object is controlled is applied to the electrical drive to control the same so that the amount of actuation of the controllable object coincides with the target value. A compensator is provided on the input side of the electrical drive, for compensating the load characteristics of the controllable object such that the output of the electrical drive does not have apparent dependency on torque of the load.

10 Claims, 13 Drawing Figures

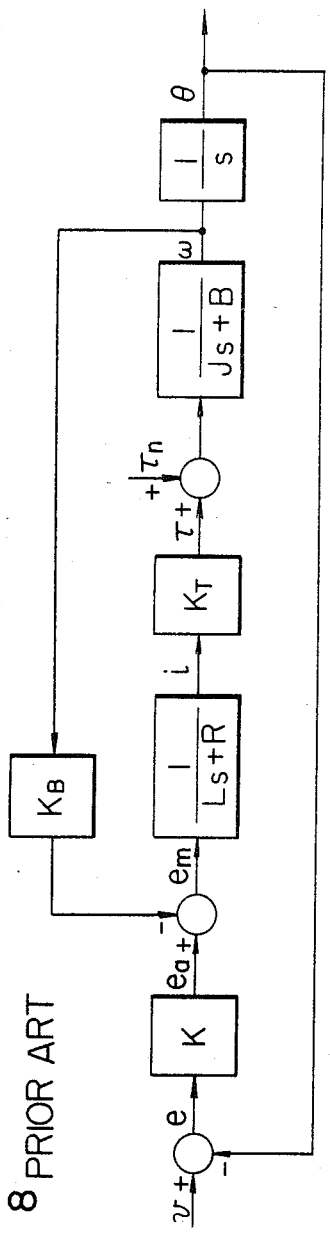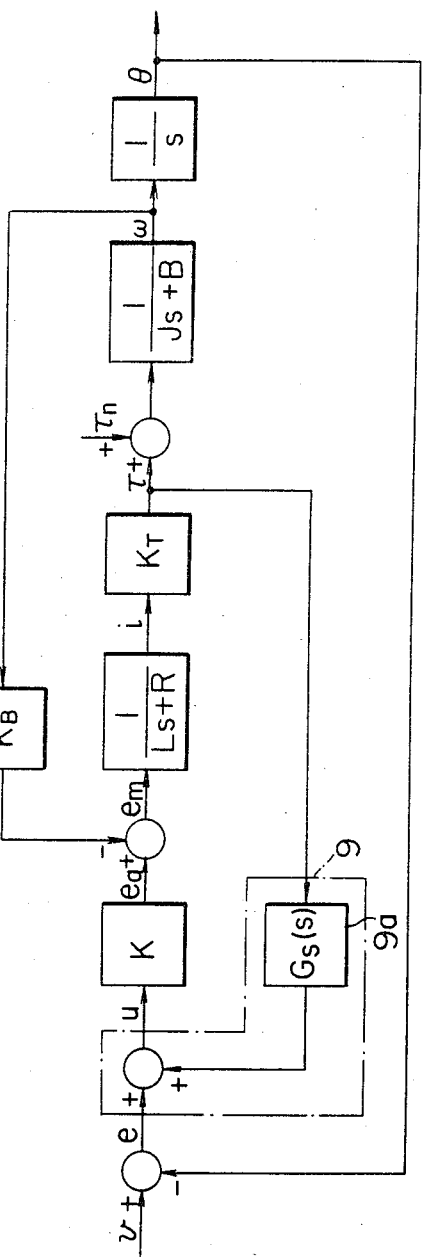
FIG. 8 PRIOR ART
FIG. 9

ELECTRIC SERVO SYSTEM

BACKGROUND OF THE INVENTION

This invention relates to an electric servo system which is unaffected by the change of or the variation in a load acting as an object to be controlled, the external disturbance, and the effect of friction at a sliding portion.

The electric servo system is utilized for a drive unit of a computer peripheral apparatus such as a magnetic tape and a magnetic disc, of a terminal apparatus such as an optical character reader, a facsimile and a laser beam printer, and of a robot. The quantity to be controlled in the electric servo system includes displacement, speed and the like.

In the electric servo system of this type of closed loop system, a very important consideration is to ensure that its transfer characteristic should be unaffected by the exchange of or the variation in the load, the external disturbance and the effect of friction at the sliding portion. A prior art as disclosed in an article entitled "Basic Study on Design of Low-sensitivity and High-speed Electric Servo" announced in Jan. 31, 1981 recognizes this importance. The elimination of load influence upon the transfer characteristic intended by the present invention is likewise discussed in this article but it is different from the present invention in the resolving manner.

In spite of the study in this field of technology, the elimination of the influence of the exchange of or variation in the load, external disturbance and effect of friction at the sliding portion upon the transfer characteristic of an electric servo system is still insufficient and practically, various machines and apparatus with the electric servo system cannot be controlled stably and accurately. For example, where the load is increased in its moment of inertia under the condition that the transfer characteristics of electric servo system is set to be an optimum for a small moment of inertia of the load, it happens that displacement or speed of the load becomes oscillatory. Also, under an effect of external disturbance upon the electric servo system, displacement or speed of the load varies. For these reasons, the controllable quantities cannot follow up target values with high-fidelity in the conventional electric servo system.

SUMMARY OF THE INVENTION

An object of the present invention is to provide an electric servo system which is unaffected by the variation in a load controlled by an electrical drive and the effect of external disturbance.

Another object of this invention is to provide an electric servo system capable of having a transfer characteristic unaffected by the variation in the load and the effect of external disturbances so as to obtain a load insensitive capability.

Still another object of this invention is to provide an electric servo system capable of making linear a non-linear characteristic of the electrical drive adapted to drive the load.

To accomplish the above objects, according to the invention, in an electric servo system comprising an electrical drive and a controllable object driven by the electrical drive whereby an error between an actual amount of actuation of the controllable object and a target value toward which the object is controlled is applied to the electrical drive to control the same so that the amount of actuation of the controllable object coincides with the target value, a compensator for compensating characteristics of the load such that the output of the electrical drive does not have apparent dependency on torque of the load is provided on the input side of the electrical drive.

Other objects, features and advantages of this invention will become apparent from the following description taken in conjunction with the accompanying drawings.

BRIEF DESCRIPTION OF THE DRAWINGS

FIG. 8 is a block diagram of a prior art electric servo system in linear form.

FIG. 9 is a block diagram showing one embodiment of the invention wherein the invention is applied to the prior art electric servo system of FIG. 8.

DESCRIPTION OF THE PREFERRED EMBODIMENTS

Figure 1:
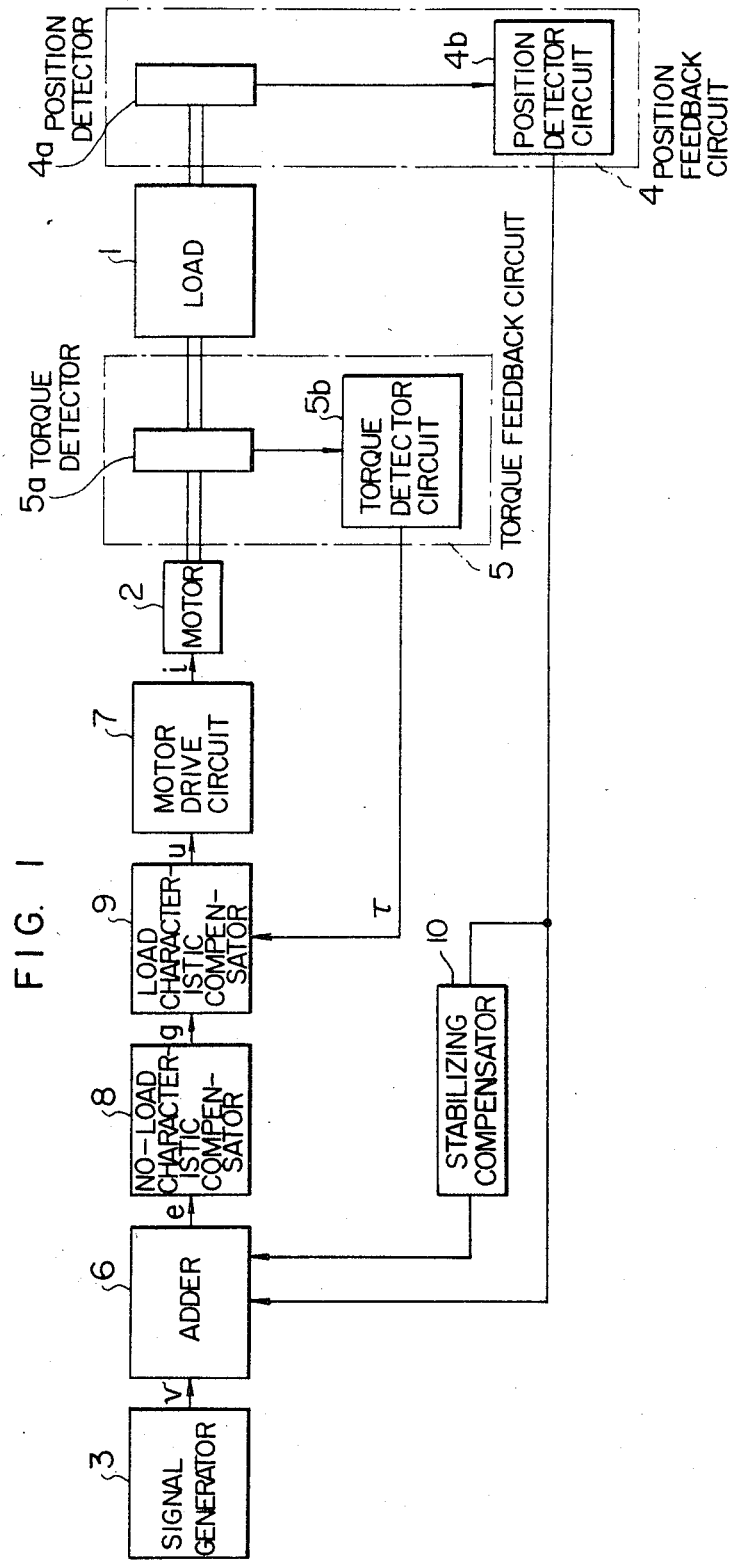
FIG. 1 is a block diagram showing one embodiment of an electric servo system according to the invention.

Referring to FIG. 1, an electric servo system embodying the invention comprises a load 1 acting as an object to be controlled or a controllable object, a motor 2 for driving the load 1, a signal generator 3 for generating a positional target value v for the load 1, and a position feedback circuit 4 comprised of a position detector 4a for detecting the position of the load 1 and a position detector circuit 4b. As shown, the position feedback circuit may include stabilizating compensator 10, when required, as hereinafter described. A torque feedback circuit 5 has a torque detector 5a for detecting torque exerted on the load 1 and a torque detector circuit 5b. An adder 6 calculates an error e between the target value v from the signal generator 3 and the position signal from the position feedback circuit 4, and a motor drive circuit 7 amplifies power of an input signal to the motor 2. A no-load characteristic compensator 8 and a load characteristic compensator 9 precede the motor drive circuit 7, with the compensator 8 being close to the signal generator 3. An output $\tau$ of the torque fed back circuit 5 is feedback to the load characteristic compensator 9.

Prior to describing the operation of the electric servo system embodying the invention, characteristics of the motor 2, one of component elements of the electric servo system, will be described by taking an armature control type DC servo motor, for example, as the motor 2. The application of the invention is in no way limited to this particular type of the DC servo motor but the invention may also be applicable to a general motor such as an AC servo motor or a linear motor.

Figure 2:
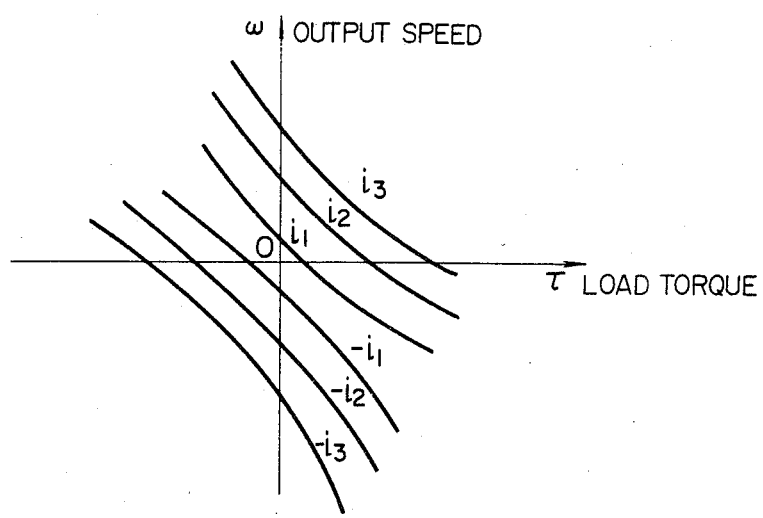
FIG. 2 is a graph showing torque/speed characteristics of a motor used in the invention.
Figure 3:
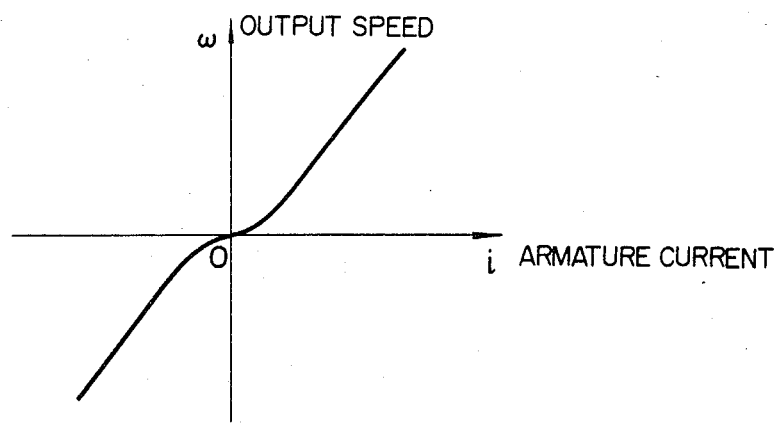
FIG. 3 is a graph showing a no-lead characteristic illustrative to the relation between current and speed when the motor is unloaded (with zero loading torque applied).

Exemplified in FIG. 2 are torque/speed characteristics of the armature control type DC servo motor. In FIG. 2, the abscissa represents load torque $\tau$ exerting the load 1, the ordinate represents output speed $\omega$ of the load 1 acting as the controllable object or the motor 2 for driving the controllable object, and parameters, generally designated by i, represent armature currents. As will be seen from FIG. 2, the output speed $\omega$ varies with the variation in the load torque $\tau$ due to the exchange of or variation in the load 1, external disturbance and effect of friction at the sliding portion under the condition that the armature current i is kept constant. This accounts for the fact that the exchange of or variation in the load 1, external disturbance and effect of friction at the sliding portion have an effect on the transfer characteristic of the electric servo system. FIG. 3 shows a no-load characteristic representative of the non-linear relation between armature current i and output speed $\omega$ for the load torque $\tau$ being zero.

Figure 4:
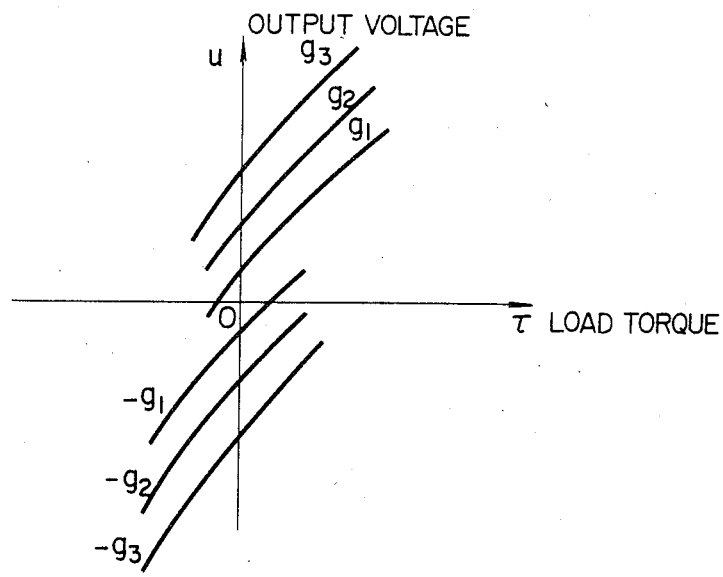
FIG. 4 is a graph showing input/output characteristics of a load characteristic compensator for compensation for the output speed of a controllable object or of a motor for driving the object in the electric servo system of the invention such that the output speed does not have apparent dependency on load torque.
Figure 5:
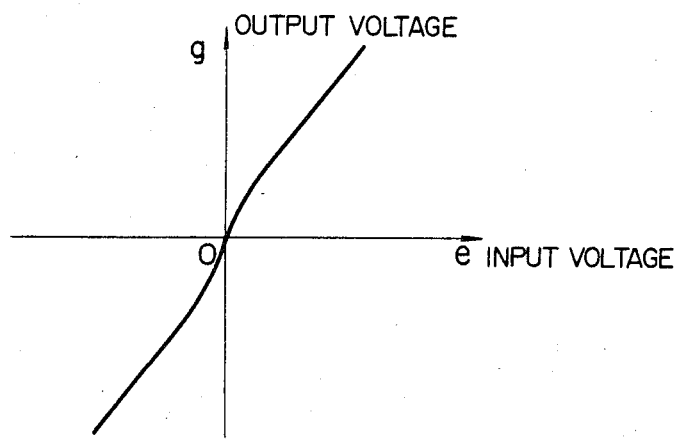
FIG. 5 is a graph showing an input/output characteristic of a no-load characteristic compensator adapted to make linear a no-load characteristic of the motor in the electric servo system of the invention.
Figure 6:
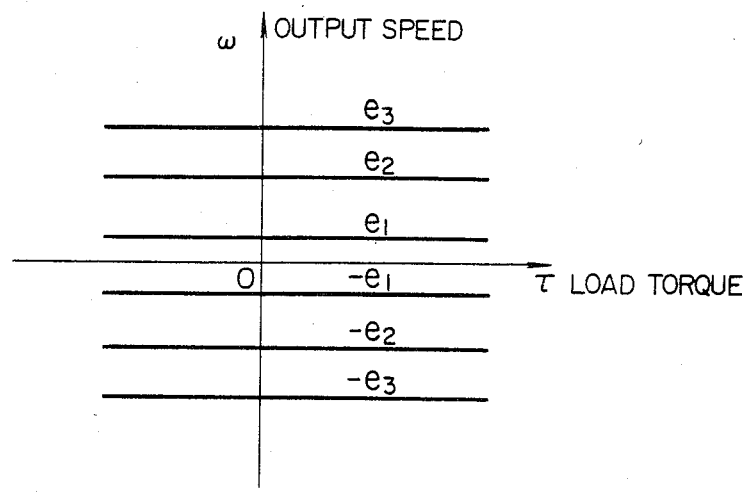
FIG. 6 is a graph showing apparent characteristics representative of the relation between load torque and output speed as obtained by the employment of the load characteristic compensator incorporating the present invention.
Figure 7:
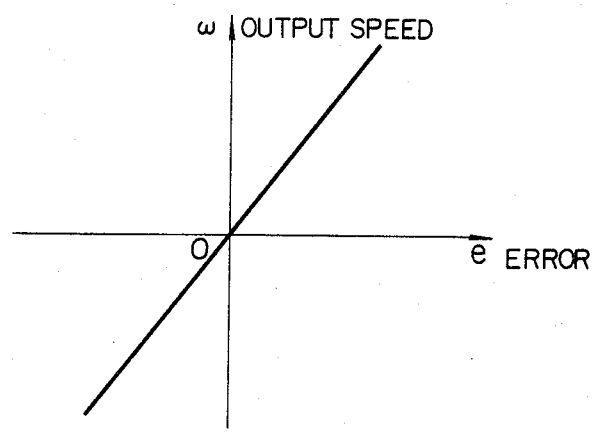
FIG. 7 is a graph showing an apparent characteristic representative of the relation between error voltage and output speed as obtained by the employment of the no-load characteristic compensator incorporating the present invention.

The no-load characteristic compensator 8 and load characteristic compensator 9 have an effect on the motor 1 having the aforementioned characteristics as will be described below. More particularly, the no-load characteristic compensator 8 has an input/output characteristic as shown in FIG. 5 where the abscissa represents the input voltage to no-load characteristic compensator 8 which corresponds to the error e and ordinate represents output voltage g from the no-load characteristic compensator 8, and the input/output characteristic of the no-load characteristic compensator 8 functions to cancel out the non-linearity of the no-load characteristic shown in FIG. 3. On the other hand, the load characteristic compensator 9 has an input/output characteristics as shown in FIG. 4 where the abscissa represents load torque $\tau$ and the ordinate represents output voltage u of the load characteristic compensator 9, thereby producing the output voltage u which is determined by the output voltage of no-load characteristic compensator 8 as shown in FIG. 5 and the load torque $\tau$. The input/output characteristics of the load characteristic compensator 9 effect the relation between load torque $\tau$ and output speed $\omega$ as shown in FIG. 2 in such a manner that the output speed $\omega$ does not have apparent dependency on the load torque. Thus, when the no-load characteristic compensator 8 and load characteristic compensator 9 are provided to precede the motor drive circuit 2, the apparent relation between load torque $\tau$ and output speed $\omega$ as shown in FIG. 6 can be obtained and hence an apparent no-load characteristic as shown in FIG. 7 can be obtained. More particularly, as shown in FIG. 6, the output speed $\omega$ becomes dependent on the apparent error e alone and independent of the load torque $\tau$, thereby making it possible to eliminate the influence of the exchange of or variation in the load 1, external disturbance and effect of friction at the sliding portion. Further, the apparent relation between error e and output speed $\omega$ becomes linear to improve compensation effect of the present invention.

The no-load characteristic compensator 8 and load characteristic compensator 9 of the characteristics as shown in FIGS. 5 and 4 may be implemented by using a desired function generator or digital computer.

The no-load characteristic compensator 8 is not always necessary to meet the intended cancellation of the influence of the exchange of or variation in the load 1, external disturbance and effect of friction at the sliding portion. The no-load characteristic compensator 8 is rather effective to make linear the transfer characteristic of the electric servo system and improve the compensation effect of the load characteristic compensator 9.

In describing another embodiment of the invention, it will first be appreciated that the transfer characteristic of the electric servo system is linear as shown in a block diagram of FIG. 8, where K: voltage amplification degree of motor drive circuit;
L: armature inductance (H);
R: armature resistance ($\Omega$);
$K_T$: torque constant (Nm/A);
$K_B$: induced voltage constant (Vs/rad);
J: equivalent moment of inertia of motor and load in combination (Nms$^2$/rad);
B: viscosity resistance torque constant (Nms/rad);
$\tau n$: external disturbance (N·m);
$\theta$: angular displacement to be controlled (rad); and
$\omega$: angular velocity (rad/s).

In the block diagram of FIG. 8, the relation between load torque and output speed $\omega$ is expressed as, $$\Omega(s) = \frac{K}{K_B} E(s) - \frac{Ls + R}{K_B \cdot K_T} T(s) \tag{1}$$

where $\Omega(s)$, E(s) and T(s) represent Laplace transforms of output speed $\omega$, error e and load torque $\tau$, respectively, and s represents the Laplace operator. When the present invention is applied to the conventional electric servo system having a linear characteristic as represented by FIG. 8, an electric servo system as shown in block form in FIG. 9 can be obtained. Where the transfer characteristic of the electric servo system as indicated in FIG. 8 is linear, the no-load characteristic compensator 8 is unnecessary and only the load characteristic compensator 9 should be provided additionally. In FIG. 9, the load characteristic compensator 9 is enclosed by chained lines. Thus, the error e and a signal resulting from the load torque $\tau$ detected and passed through a series compensator 9a are added in the load characteristic compensator 9 to produce the signal u which in turn is applied to the motor drive circuit. The series compensator 9a has a selected transfer characteristic Gs(s) such as represented by, $$G_S(s) = \frac{Ls + R}{K \cdot K_T}. \quad (2)$$

A Laplace transform U(s) of the output u of the load characteristic compensator 9 is then given by, $$U(s) = E(s) + \frac{Ls + R}{K \cdot K_T} T(s). \quad (3)$$

Under these conditions, equation (1) indicative of the relation between load torque $\tau$ and output speed $\omega$ is expressed as, $$\Omega(s) = \frac{K}{K_B} E(s) \quad (4)$$

which proves that the apparent output speed $\omega$ has no dependency on the load torque $\tau$ and the influence of the exchange of or variation in moment of inertia J associated with the load 1, external disturbance $\tau_n$ and effect of friction at the sliding portion can be cancelled out. As will be seen from FIG. 9, when the load torque $\tau$ is in proportion to the current i, $$\tau = K_T i \quad (5)$$

is held and equation (3) indicative of the input/output relation of the load characteristic compensator 9 is expressed as, $$U(s) = (Es) + \frac{Ls + R}{K} I(s) \quad (6)$$

where I(s) is a Laplace transform of current i. Further, when an error $e_m$ between output voltage $e_a$ of the motor drive circuit and motor induced voltage can be obtained, $$E_m(s) = (Ls + R)I(s) \quad (7)$$

is held between the error voltage $e_m$ and the current i. Then, from equations (6) and (7), the input/output relation of the load characteristic compensator 9 is obtained as, $$U(s) = E(s) + \frac{1}{K} E_m(s) \quad (8)$$

which represents an easy-to-materialize circuit, where $E_M(s)$ is a Laplace transform of the error voltage $e_m$. In case where the error voltage signal $e_m$ cannot be obtained directly, the relation $$E_m(s) = E_a(s) - K_B \Omega(s) \quad (9)$$

is used, where $E_a(s)$ is a Laplace transform of the output voltage $e_a$ of the motor drive circuit. Then, the input/output relation of the load characteristic compensator 9 is given by, $$U(s) = E(s) + \frac{1}{K} \{E_a(s) - K_B \Omega(s)\}. \quad (10)$$

As described above, when the load characteistic compensator 9 is additionally provided which meets either equation (3), (6), (8) or (10), the transfer characteristic of the electric servo system is given by, $$\theta(s) = \frac{1}{\frac{K_B}{K} s + 1} V(s) + O \cdot T_n(s) \quad (11)$$

where $\theta(s)$, V(s) and $T_n(s)$ represent Laplace transforms of angular displacement $\theta$ to be controlled, target value v and external disturbance $\tau_n$ respectively. It will be clear from equation (11) that the additional provision of the load characteristic compensator 9 makes the transfer characteristic of the electric servo system independent of the apparent equivalent moment of inertia J and nullifies the influence of the external disturbance $\tau_n$.

Figure 10:
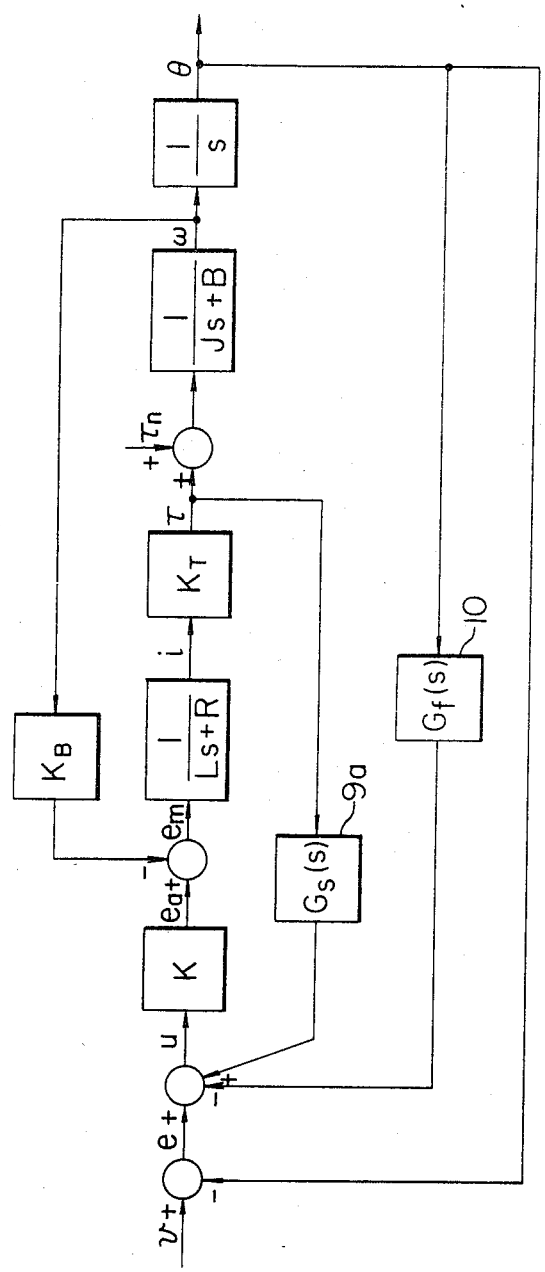
FIG. 10 is a block diagram showing an example of an electric servo system of the invention with a stabilizing compensator incorporating the invention.

The transfer characteristic between target voltage v and controllable quantity $\theta$ in FIG. 9 exhibits a characteristic of a third-order lag element but it exhibits a linear delay characteristic of equation (11) when the load characteristic compensator 9 which meets either equation (3), (6), (8) or (10) is additionally provided. Accordingly, if the characteristic of the load characteristic compensator 9 slightly deviates from the ideal state as represented by equation (3), (6), (8) or (10), a problem sometimes arises in connection with the attendant quadratic mode characteristic. In other words, a certain characteristic of the controllable object makes the attendant quadratic mode unstable. Such a problem can be solved by providing a stabilizing compensator 10 of a transfer function $G_f(s)$ as shown in FIG. 10. If the transfer function $G_f(s)$ is selected to be, for example, $$G_f(s) = K_\alpha s^2 + K_\omega s \quad (12)$$

and a compensator $G_s(s)$ is set to satisfy equation (1), then the controllable quantity $\theta$ is expressed as, $$\theta(s) = \frac{1}{K_\alpha^* s^2 + K_\omega^* s + 1} V(s) + O \cdot T_n(s) \quad (13)$$

where $K_\alpha^* = K_\alpha$ $$K_\omega^* = K_\omega + \frac{Ks}{K} \quad (14)$$

stands. Consequently, the transfer function between target value v and controllable quantity $\theta$ exhibits the quadratic delay characteristic which is determined by $K_\alpha$ and $K_\omega$ and besides it can be set to a stable mode. In this case, a linear mode is attendant but it is usually stable. In this manner, the transfer characteristic between target value v and controllable quantity $\theta$ can be made stable as a whole. It is of great significance that values of $K_\alpha^*$ and $K_\omega^*$ are independent of the moment of inertia J. Thus, the electric servo system of FIG. 2 exactly has a load and external disturbance insensitive capability. Without resort to the stabilizing compensator 10, the error e in FIG. 10 may be passed through a series compensator and then applied to the motor drive circuit for the purpose of attaining the same effect as that of the FIG. 10 embodiment. A transfer function $G_e(s)$ of the series compensator for this purpose may be selected to be, for example, $$G_e(s) = K_a s^2 + K_b s + 1 \quad (15).$$

In this manner, the transfer function between a target value v and a controllable quantity $\theta$ can be set stably.

Figure 11:
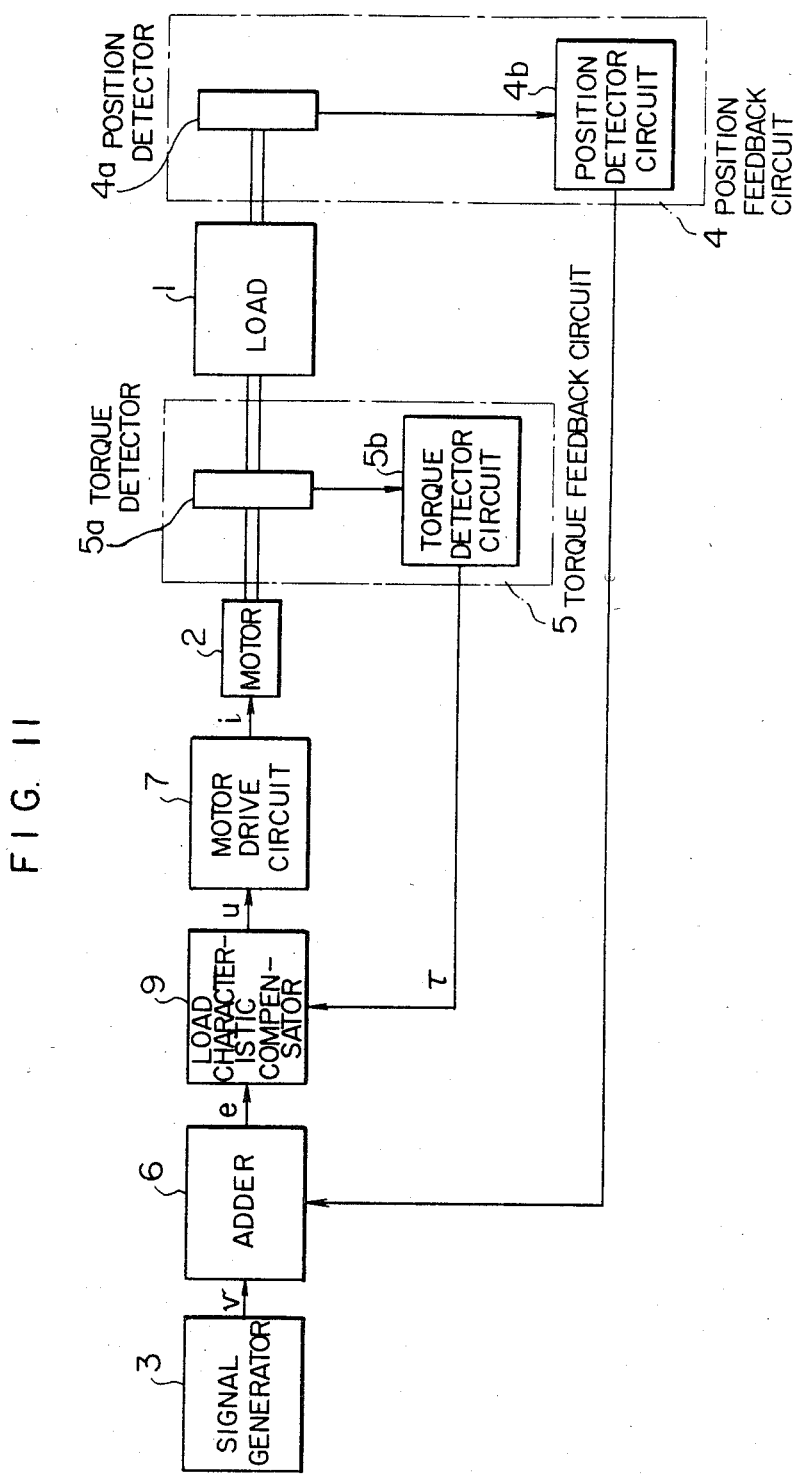
FIG. 11 is a block diagram showing another example of the electric servo system of the invention.

Of the load characteristic compensator 9 and no-load characteristic compensator 8 provided for the motor 2 in the embodiment of FIG. 1, the latter compensator is adapted to improve the non-linear relation between current and angular velocity when the load torque of the motor 2 is zero, thus making it linear. Therefore, there is no need of providing the no-load characteristic compensator 8 in the electric servo system when the no-load characteristic of the motor 2 is linear. FIG. 11 shows an electric servo system constructed in this consideration. It will also be appreciated that the stabilizing compensator 10 as shown in the FIG. 1 and FIG. 10 embodiments may be omitted in accordance with the degree of stabilization of the electric servo system.

Figure 12:
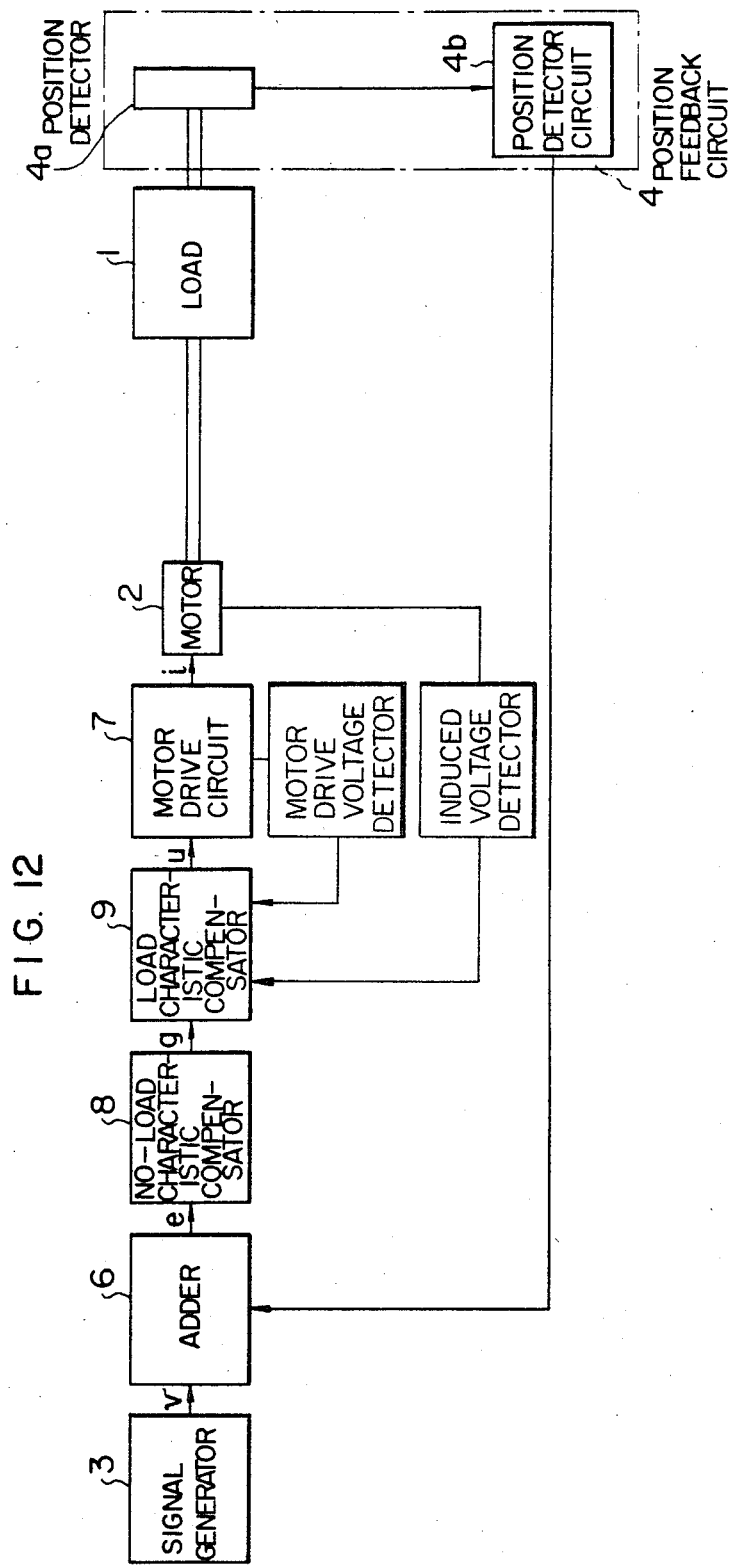
FIG. 12 is a block diagram showing a further example of the electric servo system of the invention.
Figure 13:
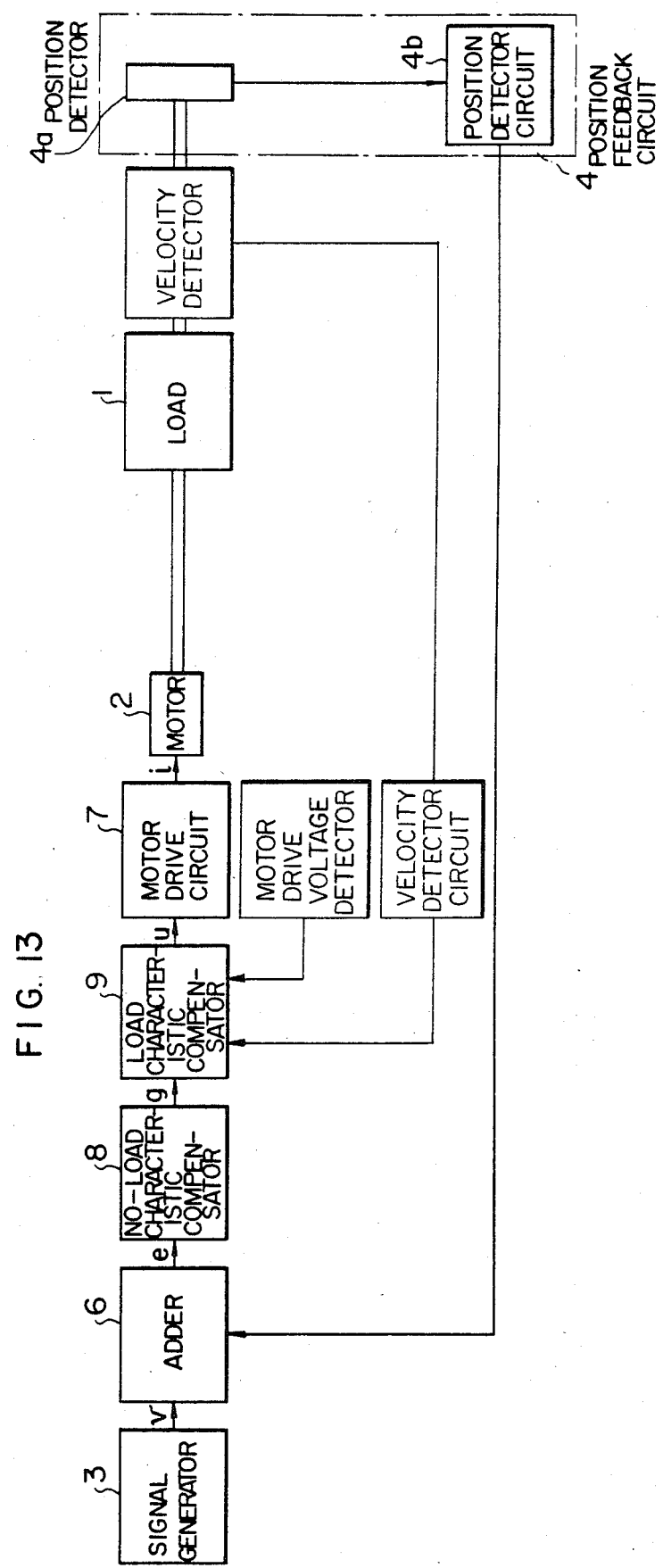
FIG. 13 is a block diagram showing another example of the electric servo system of the invention.

FIG. 12 illustrates another embodiment of the present invention wherein the load characteristic compensator 9 compensates a signal indicative of an error between an output voltage of the motor drive circuit as detected by a motor drive voltage detector and an induced voltage of the motor as detected by a motor induced voltage detector so that an output speed is substantially independent of load torque, the load characteristic compensator positively feeding back the compensated signal to the electrical drive. FIG. 13 illustrates a further embodiment wherein the load characteristic compensator 9 compensates an output voltage of the motor drive circuit as detected by a motor drive voltage detector and an output speed as detected by a velocity detector and circuit therefor so that the output speed is substantially independent of the load torque with the load characteristic compensator positively feeding back an electrical signal indicative of the compensated output voltage of the motor drive ciruict and negatively feeding back an electrical signal indicative of the compensated output speed.

As has been described, according to the present invention, the transfer characteristic of the electric servo system can be unaffected by the exchange of or variation in the load external disturbance and effect of friction at the sliding portion and the controllable quantity can follow up the target value with high-fidelity.

We claim:

1. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: compensator means conneted between the error calculating means and the drive circuit means for compensating load characteristics of the controllable object so that an output of the electrical drive means for driving the controllable object is substantially independent of torque of the load, the load characteristic compensator means positively feeding back to the electrical drive means an electrical signal indicative of the load torque through a series compensation means for enabling the output of the electrical drive means to be substantially independent of the load torque.

2. An electric servo system according to claim 1, further comprising stabilizing compensator means connected between the error calculating means and the drive circuit means for negatively feeding back the position signal so as to be applied to an input of the drive circuit means for stably maintaining a transfer function between the position target value signal and the position signal.

3. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: a compensator means connected between the error calculating means and the drive circuit means for compensating load characteristics of the electrical controllable object so that an output of the electrical drive means for driving the controllable object is substantially independent of the torque of the load, the load characteristic compensator means positively feeding back an output current of the electrical drive means to the electrical drive means through a series compensation means for enabling the output of the electrical drive means to be substantially independent of the load torque.

4. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: compensator means connected between the error calculating means and the drive circuit means for compensating load characteristics of the controllable object so that an output of the electrical drive means for driving the controllable object is substantially independent of torque of the load, the load characteristic compensator means compensating a signal indicative of an error between an output voltage of the electrical drive means and an induced voltage of the electrical drive means so that an output speed is substantially independent of the load torque, the load characteristic compensator means positively feeding back the compensated signal to the electrical drive means.

5. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: compensator means connected between the error calculating means and the drive circuit means for compensating load characteristics of the controllable object so that an output of the electrical drive means for driving the controllable object is substantially independent of torque of the load, the load characteristic means compensating an output voltage of the electrical drive means and an output speed so that the output speed is substantially independent of the load torque, the load characteristic compensator means positively feeding back an electric signal indicative of the compensated output voltage of the electrical drive means to the electrical drive means and negatively feeding back an electric signal indicative of the compensated output speed to the electrical drive means.

6. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: a first compensator means having an output terminal connected to an input terminal of the drive circuit means for compensating load characteristics of the controllable object so that an output of the electrical drive means is substantially independent of torque of the load; and second compensator means connected between the error calculating means and the first compensator means for compensating no-load characteristics of the electrical drive means so as to make linear a non-linear input/output characteristic of the electrical drive means under no-load, the first compensator means positively feeding back to the electrical drive means an electrical signal indicative of the load torque through a series compensation means for enabling the output of the electrical drive means to be substantially independent of the load torque.

7. An electric servo system according to claim 6, further comprising stabilizing compensator means connected between the error calculating means and the drive circuit means for negatively feeding back the position signal so as to be applied to an input of the drive circuit means for stably maintaining a transfer function between the position target value signal and the position signal.

8. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: first compensator means having an output terminal connected to an input terminal of the drive circuit means for compensating laod characteritics of the controllable object so that an output of the electrical drive means is substantially independent of torque of the load; and second compensator means connected between the error calculating means and the first compensator means for compensating no-load characteristics of the electrical drive means so as to make linear a non-linear input/output characteristic of the electrical drive means under no-load, the first compensator means positively feeding back an output current of the electrical drive means to the electrical drive means through a series compensation means for enabling the output of the electrical drive means to be substantially independent of the load torque.

9. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: first compensator means having an output terminal connected to an input terminal of the drive circuit means for compensating load characteristics of the controllable object so that an output of the electrical drive means is substantially independent of torque of the load; and second compensator means connected between the error calculating means and the first compenstor means for compensating no-load characteristics of the electrical drive means so as to make a non-linear input/output characteristic of the electrical drive means under no-load, the first compensator means compensating a signal indicative of an error between an output voltage of the electrical drive means and an induced voltage of the electrical drive means so that an output speed is substantially independent of the load torque, the first compensator means positively feeding back the compensated signal to the electrical drive means.

10. In a position electric servo system including electrical drive means, a controllable object driven by the electrical drive means and acting as a load, signal generator means for generating a position target value signal for the load, position detector means for detecting a position of the load and for providing a position signal indicative thereof, means for calculating an error between the position target value signal from the signal generator means and the position signal from the position detector means and for providing an error signal indicative thereof, and drive circuit means responsive to the error signal for providing an amplified input signal to the electrical drive means, the improvement comprising: first compensator means having an output terminal connected to an input terminal of the drive circuit means for compensating load characteristics of the controllable object so that an output of the electrical drive means is substantially independent of torque of the load; and second compensator means connected between the error calculating means and the first compensator means for compensating no-load characteristics of the electrical drive means so as to make linear a non-linear input/output characteristic of the electrical drive means under no-load, the first compensator means compensating an output voltage of the electrical drive means and an output speed so that the output speed is substantially independent of the load torque, the first compensator means positively feeding back an electric signal indicative of the compensated output voltage of the electrical drive means and negatively feeding back an electrical signal indicative of the compensated output speed to the electrical drive means.

* * * * *